(12) United States Patent
Hattori et al.

(10) Patent No.: US 11,312,419 B2
(45) Date of Patent: Apr. 26, 2022

(54) VEHICLE LOWER PORTION STRUCTURE

(71) Applicant: Toyota Jidosha Kabushiki Kaisha, Toyota (JP)

(72) Inventors: Ryo Hattori, Kariya (JP); Yuchi Yamanouchi, Toyota (JP); Masaki Shitara, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 16/909,478

(22) Filed: Jun. 23, 2020

(65) Prior Publication Data
US 2020/0406978 A1 Dec. 31, 2020

(30) Foreign Application Priority Data

Jun. 28, 2019 (JP) .............................. JP2019-121687

(51) Int. Cl.
| | | |
|---|---|---|
| *B60J 7/00* | (2006.01) | |
| *B62D 21/17* | (2006.01) | |
| *B62D 25/20* | (2006.01) | |
| *B60K 1/04* | (2019.01) | |
| *B62D 24/00* | (2006.01) | |

(52) U.S. Cl.
CPC ................ *B62D 21/17* (2013.01); *B60K 1/04* (2013.01); *B62D 24/00* (2013.01); *B62D 25/20* (2013.01); *B60K 2001/0438* (2013.01)

(58) Field of Classification Search
CPC .... B62D 33/0604; B62D 35/001; B62D 1/28; B60R 21/11; B65F 2003/0279; B60P 3/07; B60P 3/08; G07B 15/063; G01S 13/931; G01C 21/28

See application file for complete search history.

(56) References Cited

U.S. PATENT DOCUMENTS

| | | | | |
|---|---|---|---|---|
| 6,502,883 B2* | 1/2003 | Rice | ......................... | F16F 15/08 |
| | | | | 296/35.1 |
| 7,048,265 B2* | 5/2006 | Huprikar | ............... | F16F 1/3732 |
| | | | | 267/141.1 |
| 7,364,223 B2* | 4/2008 | Mori | .................. | B62D 33/0604 |
| | | | | 296/190.07 |
| 9,764,775 B2* | 9/2017 | Daigaku | .............. | B62D 25/025 |
| 2016/0137228 A1* | 5/2016 | Atsumi | ................... | B62D 25/20 |
| | | | | 296/204 |
| 2018/0272852 A1* | 9/2018 | Ajisaka | .................... | B60K 1/04 |

(Continued)

FOREIGN PATENT DOCUMENTS

JP 2012-192764 A 10/2012

*Primary Examiner* — Kiran B Patel

(74) *Attorney, Agent, or Firm* — Dinsmore & Shohl LLP

(57) ABSTRACT

A vehicle lower portion structure includes side rails respectively disposed on right and left sides and extending along a longitudinal direction, and further includes a cab mount bracket fixed to an outer side of each of the side rails in a vehicle width direction, in which a vehicle body is secured above the cab mount bracket. The vehicle lower portion structure further includes a connector disposed on an upper side of the cab mount bracket and configured to connect the cab mount bracket to the vehicle body, in which at least one of a wire harness and a brake pipe is arranged outside of at least one of the side rails in the vehicle width direction in a region located inward of the connector in the vehicle width direction and upward of the cab mount bracket.

4 Claims, 4 Drawing Sheets

(56) References Cited

U.S. PATENT DOCUMENTS

| | | | | |
|---|---|---|---|---|
| 2018/0370577 A1* | 12/2018 | Takahashi | ........... | B62D 25/2036 |
| 2019/0276080 A1* | 9/2019 | Otoguro | ................. | B62D 25/20 |
| 2020/0406736 A1* | 12/2020 | Hattori | ................... | B60L 50/66 |
| 2020/0406764 A1* | 12/2020 | Konno | ................... | B60L 53/16 |
| 2020/0406802 A1* | 12/2020 | Shitara | ................... | B62D 31/00 |
| 2020/0406935 A1* | 12/2020 | Yamanouchi | ........... | B60K 35/00 |
| 2020/0406973 A1* | 12/2020 | Nagaya | ................... | B60R 16/04 |
| 2021/0039716 A1* | 2/2021 | Sasaoka | ............. | B62D 25/2036 |
| 2021/0138953 A1* | 5/2021 | Yabushita | .............. | B60N 2/005 |
| 2021/0155146 A1* | 5/2021 | Yabushita | .............. | B65G 67/20 |
| 2021/0261202 A1* | 8/2021 | Kawashima | ........... | B62D 25/20 |

\* cited by examiner

VEHICLE LOWER PORTION STRUCTURE

CROSS REFERENCE TO RELATED APPLICATION

This application claims priority to Japanese Patent Application No. 2019-121687 filed on Jun. 28, 2019, which is incorporated herein by reference in its entirety including the specification, claims, drawings, and abstract.

TECHNICAL FIELD

The present disclosure relates to a vehicle lower portion structure including side rails, which are disposed on right and left sides of a vehicle and extend along a longitudinal direction of the vehicle, and a cab mount bracket which is fixed to outer sides, in a vehicle width direction, of the side rails, in which a vehicle body is secured above the cab mount bracket.

BACKGROUND

A vehicle lower portion structure is disclosed in JP 2012-192764 A, in which a brake pipe is arranged, in a vehicle width direction, inward of side rails that are disposed, one each on right and left sides, and extend along a longitudinal direction.

When a wire harness and the brake pipe are arranged, in the vehicle width direction, inward of the side rails, a portion of a space between the side rails that is needed for arranging the wire harness and the brake pipe must be spared, and thus cannot be utilized effectively. On the other hand, in a case where the wire harness and the brake pipe are arranged outside the side rails in the vehicle width direction, there is a possibility that the wire harness and the brake pipe will be damaged in the event of a side-on collision or other collision.

Given the above circumstances, an advantageous effect of the present disclosure is to provide a vehicle lower portion structure in which a space between side rails can be effectively utilized while protecting a wire harness and a brake pipe.

SUMMARY

According to an aspect of the present disclosure, a vehicle lower portion structure includes side rails which are respectively disposed on a right side and a left side and extend along a longitudinal direction, and further includes a cab mount bracket which is fixed to an outer side of each of the side rails in a vehicle width direction, in which a vehicle body is secured above the cab mount bracket. The vehicle lower portion structure further includes a connector which is disposed on an upper side of the cab mount bracket and is configured to connect the cab mount bracket and the vehicle body, in which at least one of a wire harness and a brake pipe is arranged, in the vehicle width direction, outside of at least one of the side rails in a region located inward of the connector in the vehicle width direction and upward of the cab mount bracket.

When the wire harness and the brake pipe are arranged, in the vehicle width direction, outside of the side rail in the region located inward of the connector in the vehicle width direction and upward of the cab mount bracket as described above, it becomes possible to provide the vehicle lower portion structure in which a space between the side rails can be effectively utilized while protecting the wire harness and the brake pipe.

According to an aspect of this disclosure, in the vehicle lower portion structure, the connector may include a plurality of connectors, the cab mount bracket may be joined to the vehicle body via the plurality of connectors, and at least one of the wire harness and the brake pipe may be arranged, in the vehicle width direction, inward of an outermost one of the connectors joined to the cab mount bracket.

In the above-described configuration, the positioning of the wire harness and the brake pipe outside of the side rails in the vehicle width direction can allow effective utilization of the space between the side rails, while the positioning of the wire harness and the brake pipe inward of the outermost one of the connectors in the vehicle width direction can provide protection of the wire harness and the brake pipe.

According to an aspect of this disclosure, in the vehicle lower portion structure, a battery is placed between the side rails.

In the above-described configuration, because the wire harness or the brake pipe is arranged outside of the side rails in the vehicle width direction, the volume of the battery disposed between the side rails can be increased from that installed in a case where the wire harness or the brake pipe is arranged inside of the side rails in the vehicle width direction.

The present disclosure can provide the vehicle lower portion structure in which a space between the side rails can be effectively utilized, while protecting the wire harness and the brake pipe.

BRIEF DESCRIPTION OF DRAWINGS

Embodiments of the present disclosure will be described based on the following figures, wherein.

DESCRIPTION OF EMBODIMENTS

Figure 1:
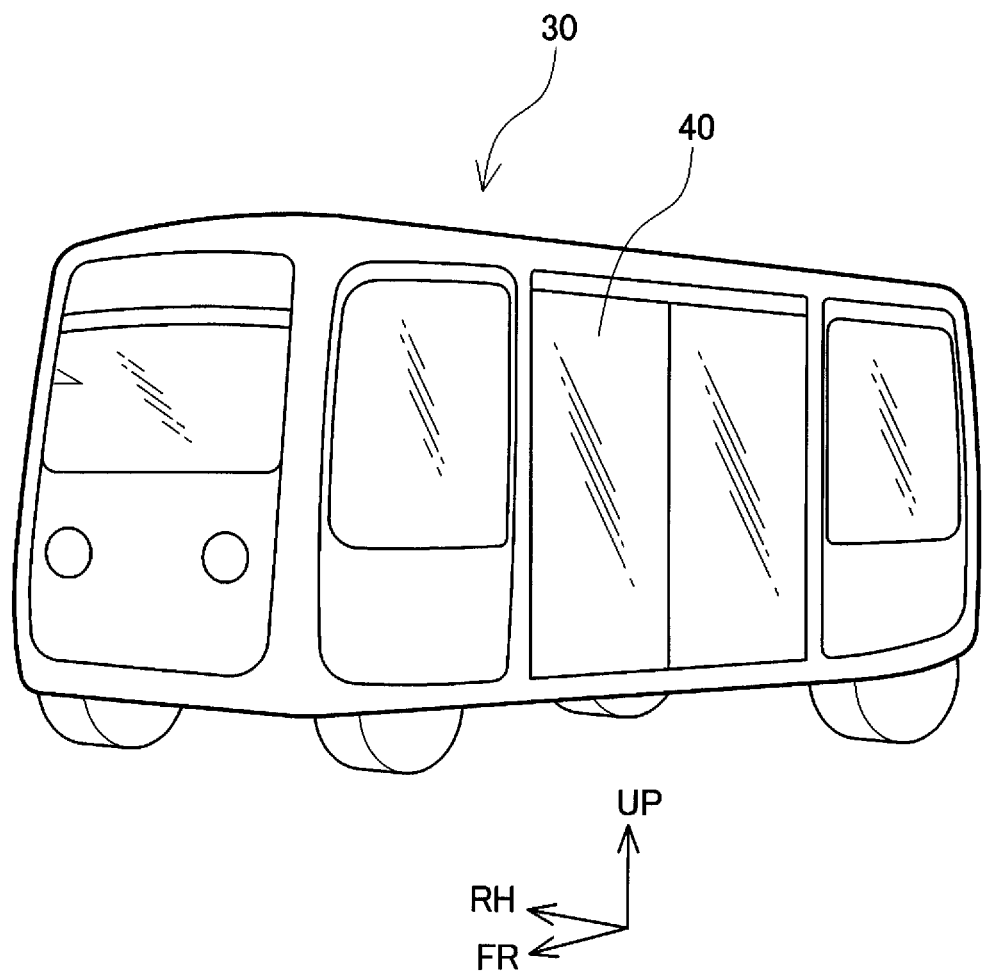
FIG. 1 is a perspective view of a vehicle equipped with a vehicle lower portion structure according to a first embodiment.

Hereinafter, embodiments of a vehicle lower portion structure according to this disclosure will be described with reference to the drawings. Arrows FR, UP, and RH shown in the drawings which will be referenced in the following explanation represent a forward direction (a travel direction), an upward direction, and a right hand direction of a vehicle, respectively. Further, directions opposite to those indicated by the arrows FR, UP, and RH represent a rearward direction, a downward direction, and a left hand direction of the vehicle, respectively. Hereinafter, unless otherwise specified, descriptions simply using terms of forward, rearward, right, left, upward, downward, and the like will denote forward or rearward in a vehicle longitudinal direction, right or left in a vehicle lateral direction (vehicle width direction), and upward or downward in a vehicle vertical direction.

Embodiment 1

Figure 2:
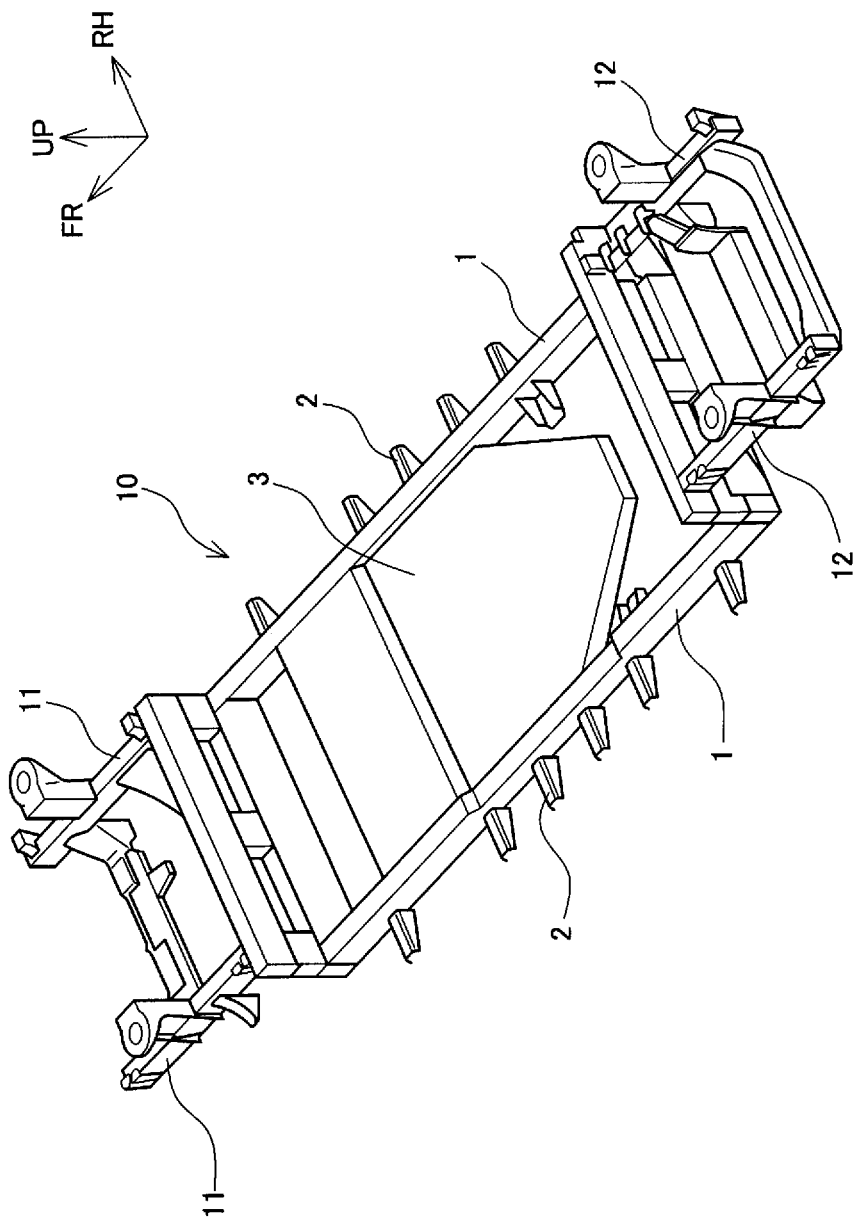
FIG. 2 is a perspective view showing side rails and cab mount brackets in the vehicle lower portion structure according to the first embodiment.
Figure 3:
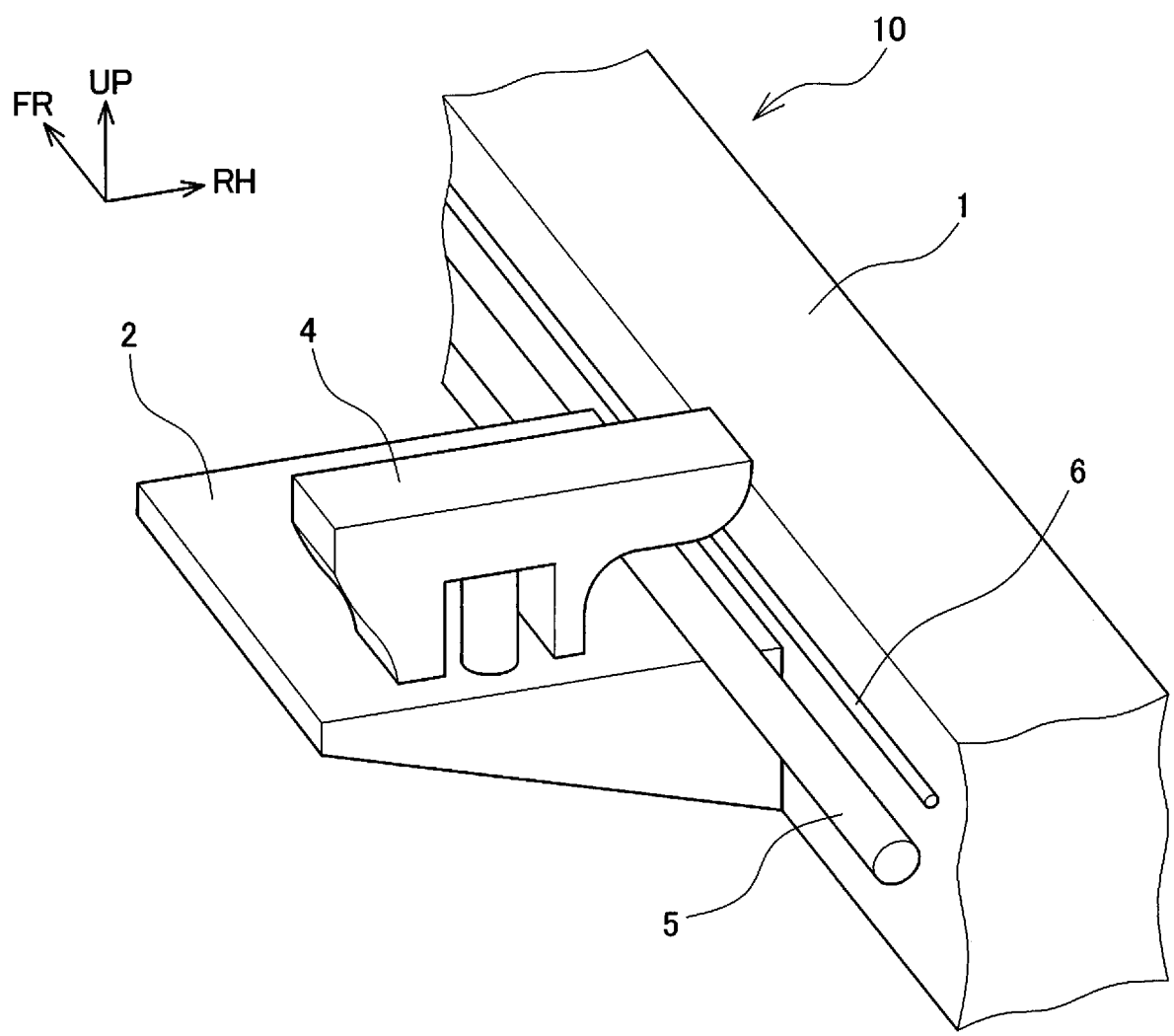
FIG. 3 is a perspective view showing an arrangement of a wire harness and a brake pipe in the vehicle lower portion structure according to the first embodiment.

As shown in FIG. 1, a vehicle 30 equipped with a vehicle lower portion structure 10 according to a first embodiment has, on a left side surface, a door 40 for allowing a person to get on or off the vehicle 30. As shown in FIG. 2, the vehicle lower portion structure 10 according to the first embodiment includes side rails 1 which are respectively disposed on right and left sides and extend along the longitudinal direction, and cab mount brackets 2 which are fixed to an outer side of each of the side rails 1 in the vehicle width direction, in which a vehicle body is secured above the cab mount brackets 2. The cab mount brackets 2 are fixed, six each for the side rails 1 which are respectively disposed on the right and left sides. A battery 3 is disposed between the two side rails 1. In regions located forward of the right and left side rails 1, front side members 11 extending along the longitudinal direction are respectively arranged on the right and left sides. Further, in regions located rearward of the right and left side rails 1, rear side members 12 extending along the longitudinal direction are respectively arranged on the right and left sides. There are two spaces, including a vehicle front space, which is formed inward of the right and left front side members 11 in the vehicle width direction and also downward of the right and left front side members 11, and a vehicle rear space, which is formed inward of the right and left side members 12 in the vehicle width direction and also downward of the right and left rear side members 12. One of the two spaces is configured to accommodate a drive unit (not illustrated), such as a motor and an inverter, and an electronic controller (not illustrated), while the other of the two spaces is configured to accommodate a brake unit (not illustrated). FIG. 3 is a perspective view showing the side rail 1 disposed on the left side, one of the cab mount brackets 2 fixed to the left side rail 1, and a connector 4 which connects the cab mount bracket 2 and the vehicle body, along with an arrangement of a wire harness 5 and a brake pipe 6. The wire harness 5 is configured to connect the battery 3 to the not-illustrated drive unit placed within either the vehicle front space or the vehicle rear space. The brake pipe 6 is a pipe through which a brake oil for a hydraulic brake flows, and is configured to connect wheels, which are not illustrated, to the not-illustrated brake unit disposed within either the vehicle front space or the vehicle rear space. As shown in FIG. 3, the vehicle lower portion structure 10 includes, on an upper side of the cab mount bracket 2, a connector 4 used for connecting the cab mount bracket 2 and the vehicle body. Then, outside of the side rail 1 in the vehicle width direction, the wire harness 5 and the brake pipe 6 are arranged so as to extend along the longitudinal direction in a region located inward of the connector 4 in the vehicle width direction and upward of the cab mount bracket 2. It should be noted that a not-illustrated floor panel is installed above the side rail 1, and the wire harness 5 and the brake pipe 6 are arranged below the floor panel.

When the wire harness 5 and the brake pipe 6 are arranged, as described above, outside of the side rails 1 in the vehicle width direction in the region located inward of the connector 4 in the vehicle width direction and upward of the cab mount bracket 2, a space between the two side rails 1 can be effectively utilized, while the wire harness 5 and the brake pipe 6 can be protected by the cab mount brackets 2 and connectors 4. Further, the volume of the battery 3 disposed between the side rails 1 can be increased from that in a case where the wire harness 5 and the brake pipe 6 are arranged, in the vehicle width direction, inside of the side rails 1.

Embodiment 2

Next, a vehicle lower portion structure 20 according to a second embodiment will be described. The vehicle lower portion structure 20 in the second embodiment also includes, as in the case of the vehicle lower portion structure 10 in the first embodiment shown in FIG. 2, the side rails 1 which are respectively disposed on right and left sides and extend along the longitudinal direction, and the cab mount brackets 2 which are fixed to the outer side of each of the side rails 1 in the vehicle width direction, in which the vehicle body is secured above the cab mount brackets 2. Each of the right and left side rails 1 includes six cab mount brackets 2. The battery 3 is disposed between the right and left side rails 1.

Figure 4:
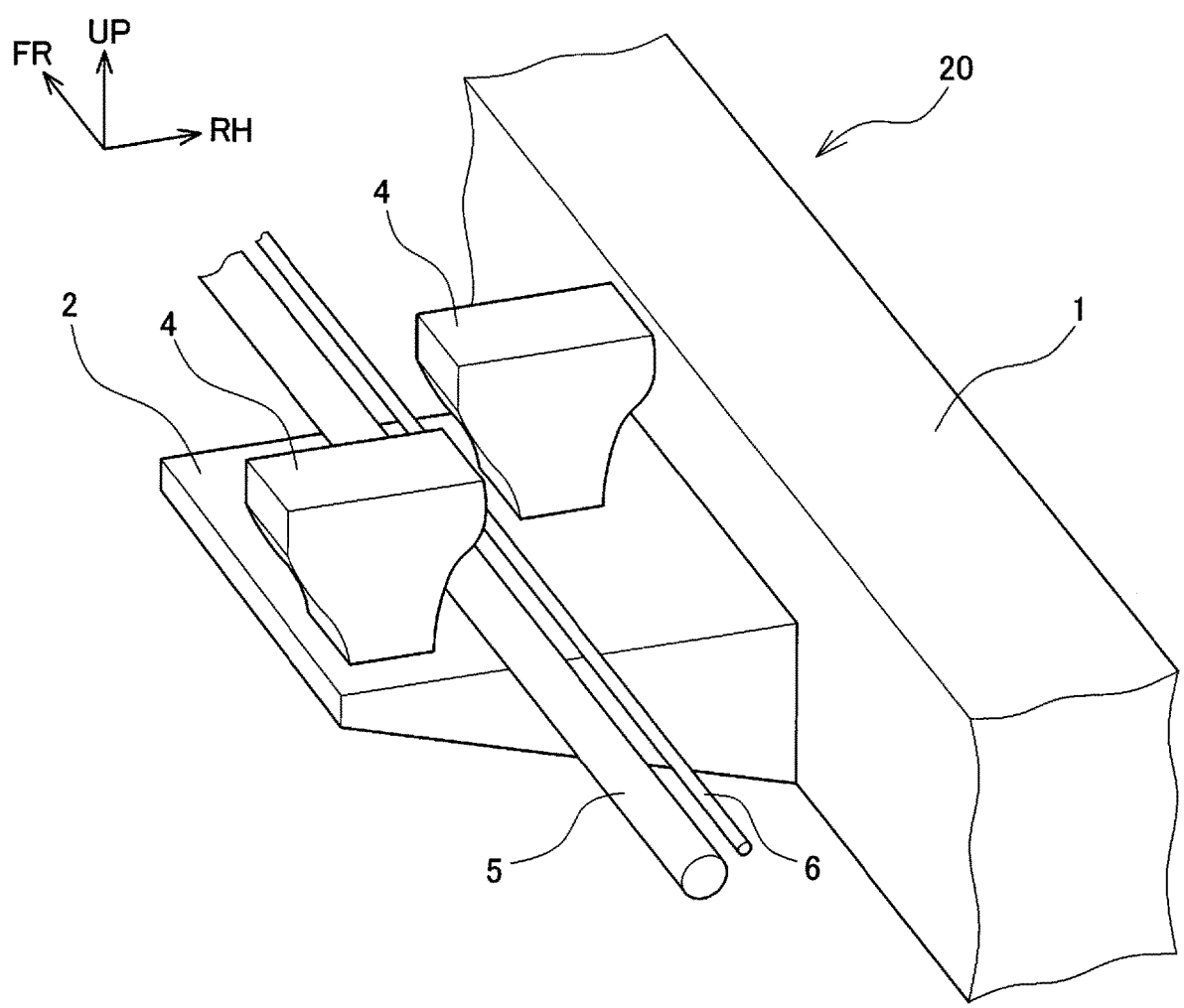
FIG. 4 is a perspective view showing an arrangement of a wire harness and a brake pipe in the vehicle lower portion structure according to a second embodiment.

As shown in FIG. 4, in the vehicle lower portion structure 20, each of the cab mount brackets 2 is joined to the vehicle body by two connectors 4. Then, outside in the vehicle width direction of the left side rail 1, the wire harness 5 and the brake pipe 6 are arranged so as to extend along the longitudinal direction in a region located, in the vehicle width direction, inward of an outer one of the two connectors, which are joined for each of the cab mount brackets 2, and also upward of the cab mount brackets 2.

Such positioning of the wire harness 5 and the brake pipe 6 outside of the side rails 1 in the vehicle width direction can allow effective utilization of the space between the two side rails 1, and the positioning of the wire harness 5 and the brake pipe 6 inward, in the vehicle width direction, of the outer one of the connectors 4 and upward of the cab mount brackets 2 can provide protection of the wire harness 5 and the brake pipe 6. In addition, in contrast to the case where the wire harness 5 and the brake pipe 6 are arranged inward of the side rails 1 in the vehicle width direction, the volume of the battery 3 disposed between the side rails 1 can be increased.

SUPPLEMENTAL INFORMATION OF EMBODIMENT

The vehicle lower portion structure in this disclosure is not limited to the above-described embodiments, and may be implemented in various forms within the scope of the gist of this disclosure. For example, the vehicle lower portion structure may have a form in which only one of the wire harness and the brake pipe is arranged outside of the side rails in the vehicle width direction in the region located inward of the connectors in the vehicle width direction and upward of the cab mount brackets. Alternatively, the wire harness and the brake pipe may not be arranged outside of one of the side rails, and may be only arranged outside of the other of the side rails in the vehicle width direction in the region located inward of the connectors in the vehicle width direction and upward of the cab mount brackets. In addition, the number of the cab mount brackets fixed to one side rail may be greater than or smaller than six.

The invention claimed is:

1. A vehicle lower portion structure, comprising:
   side rails which are respectively disposed on a right side and a left side, and extend along a longitudinal direction;
   a cab mount bracket which is fixed to an outer side of each of the side rails in a vehicle width direction, wherein a vehicle body is secured above the cab mount bracket; and
   a connector which is disposed on an upper side of the cab mount bracket and is configured to connect the cab mount bracket and the vehicle body, wherein at least one of a wire harness and a brake pipe is arranged, in the vehicle width direction, outside of at least one of the side rails in a region located inward of the connector in the vehicle width direction and upward of the cab mount bracket.

2. The vehicle lower portion structure according to claim 1, wherein:
the connector comprises a plurality of connectors;
the cab mount bracket is joined to the vehicle body via the plurality of connectors; and
at least one of the wire harness and the brake pipe is arranged, in the vehicle width direction, inward of an outermost one of the plurality of connectors joined to the cab mount bracket.

3. The vehicle lower portion structure according to claim 1, wherein a battery is placed between the side rails.

4. The vehicle lower portion structure according to claim 2, wherein a battery is placed between the side rails.

* * * * *